July 1, 1958
W. G. COLGAN
2,841,245
OIL-CATCHING RECEPTACLE WITH SPEED-CONTROLLED
OIL-DISCHARGER ATTACHMENT FOR AUTOMOBILES
Filed May 10, 1956
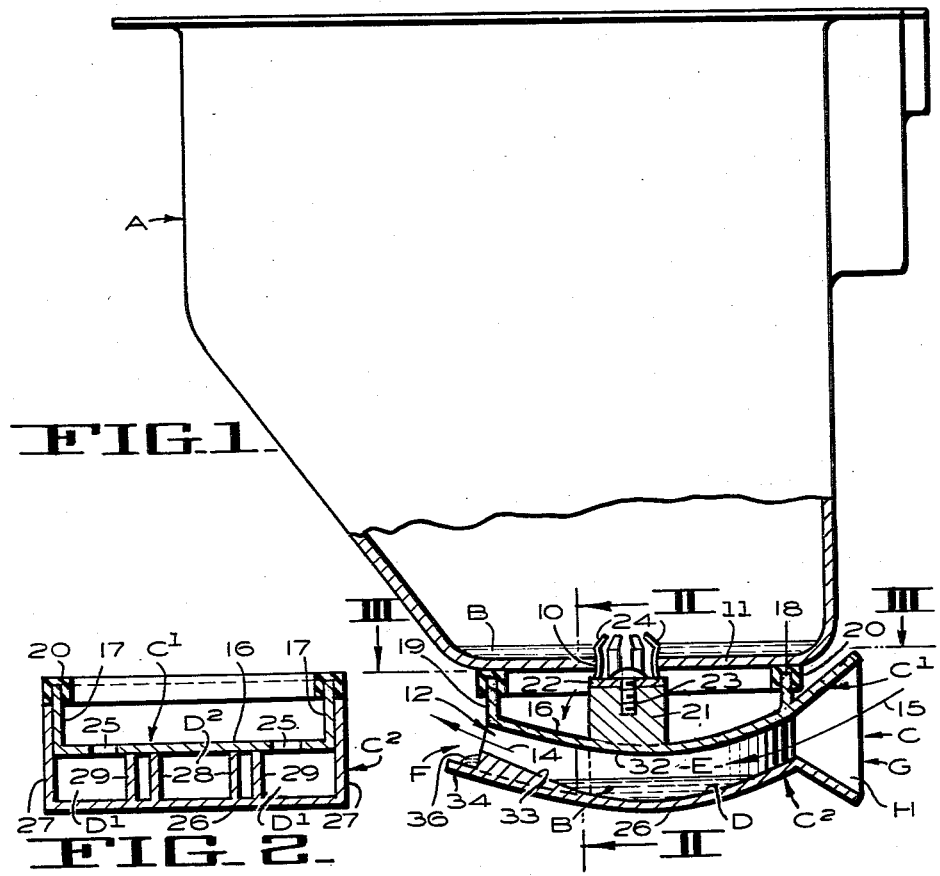
FIG.1
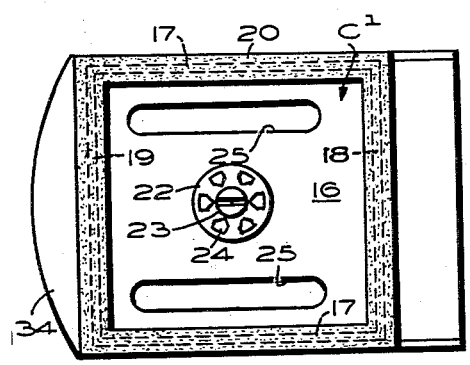
FIG.2
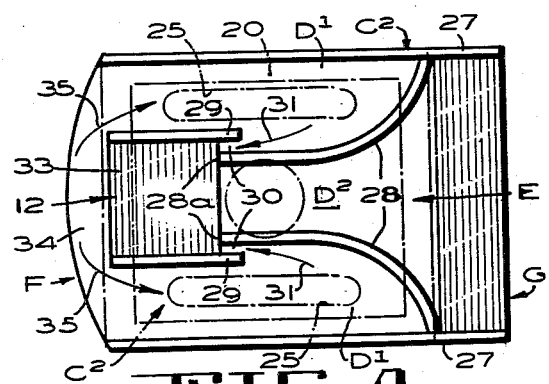
FIG.3
FIG.4
INVENTOR
WILLIAM G. COLGAN
BY Munn & Liddy
ATTORNEYS

United States Patent Office 2,841,245
Patented July 1, 1958

2,841,245

OIL-CATCHING RECEPTACLE WITH SPEED-CONTROLLED OIL-DISCHARGER ATTACHMENT FOR AUTOMOBILES

William G. Colgan, Oakland, Calif.

Application May 10, 1956, Serial No. 584,016

8 Claims. (Cl. 184—106)

It is a well known fact that oil will drip from the clutch pan of an automobile, while the latter is parked, as for instance in a garage. This presents an unsightly situation on the floor.

Accordingly, and as a cardinal object of this invention, it is proposed to provide a receptacle which may be readily attached to the clutch pan of the automobile to catch oil dripping therefrom. Moreover, the oil is retained in the receptacle until the automobile is being driven at a predetermined speed, at which time the oil will be discharged upon the roadway. In this manner the oil is precluded from dripping on the floor of the garage.

More particularly described, it is proposed to provide a receptacle having a sump disposed for collecting oil as the latter drips from the clutch pan. This receptacle defines a wind-tunnel passageway through which air will flow, as the automobile is advanced. When the automobile has reached a predetermined speed, the oil will be entrained by the air flowing through the passageway so as to discharge the oil on the roadway.

Another object of the invention is to provide a device of the character described which is simple in construction, durable and efficient for the purpose intended.

Other objects and advantages will appear as the specification continues. The novel features will be particularly set forth in the claims hereunto appended.

Drawing

For a better understanding of the invention, reference should be had to the accompanying drawing, forming part of this application, in which:

Figure 1 is a side elevational view of a conventional clutch pan, disclosing my oil-catching receptacle and oil-discharger attachment mounted therebeneath, parts being shown in section;

Figure 2 is a transverse sectional view taken along the vertical plane II—II of Figure 1;

Figure 3 is a top plan view of the assembled attachment, as observed from the horizontal plane III—III of Figure 1;

Figure 4 is a plan view of the lower section of the attachment, the upper section being shown as being superimposed thereon by dot-dash lines.

While I have shown only the preferred form of my invention, it should be understood that various changes, or modifications, may be made within the scope of the annexed claims without departing from the spirit thereof.

Detailed description

Referring to the drawing, it will be noted that I have disclosed a conventional clutch pan A, which is fashioned with an outlet opening 10 in its lower wall 11. It is a well known fact that a small quantity of oil B will accumulate in the bottom of the pan. This oil will drain through the opening 10; and, normally, will drop onto the floor of the garage.

As illustrated in Figure 1, my oil-catching receptacle with speed-controlled oil-discharger attachment is designated generally at C. It is mounted beneath the clutch pan in a position to receive the oil flowing through the opening 10. Broadly speaking, the attachment defines a sump D, which is designed to receive the oil B as the latter gravitates downwardly. This sump includes lateral portions $D^1$ and a central portion $D^2$ (see Figure 4).

Moreover, the attachment defines a wind-tunnel passageway E that extends therethrough in a fore-and-aft direction, relative to the travel of the automobile. When the automobile has reached a predetermined speed, the velocity of the air flowing through the passageway E will be sufficient to entrain the oil from the sump D and discharge it through a restricted outlet 12 of the passageway at the trailing end F of the attachment, as suggested by the arrow 14. The leading end G of the attachment defines a funnel-shaped entrance H, which forms the forward part of the passageway E. As the automobile advances, air will flow into this entrance, as suggested by the arrow 15 to thus entrain the oil.

It will be noted from Figures 1 and 2 that the attachment C is made in upper and lower sections $C^1$ and $C^2$, respectively. These sections may be secured together by any suitable means; for example, if the attachment is molded from plastic, they may be cemented one to the other.

In its structural features, the upper section $C^1$ is channel-shaped in cross-section (see Figure 2), defining a bottom web 16 and a pair of spaced-apart upstanding side flanges 17, which rise vertically from the web. Moreover, this section has upstanding front and rear flanges 18 and 19, respectively, which extend transversely between the side flanges 17 (see Figures 1 and 3). Thus the flanges 17, 18 and 19 define a rectangular wall upon which a gasket 20 is mounted. The gasket abuts the lower wall 11 of the clutch pan A to provide a seal therebetween, and further serves to preclude the attachment C from rattling.

Any suitable means may be provided for securing the attachment C to the clutch pan A. For this purpose, the web 16 of the upper section $C^1$ has been shown as being formed with a boss 21, the latter having a button 22 secured thereto by a screw 23. This button carries a plurality of upwardly-extending resilient fingers 24, which are adapted to be inserted through the opening 10 (see Figure 1). These fingers are shaped to yieldingly engage with the wall of the opening 10 to thus removably anchor the attachment C to the clutch pan, with the button 22 being spaced a short distance below the lower wall 11 of the pan.

Obviously, the oil B in the clutch pan A will drain through the spaces between the fingers 24 and will drop onto the bottom web 16 of the upper section $C^1$. This web is concaved on its upper surface, and it slopes from the flanges 18 and 19 towards a lower point approximately midway between these flanges. The web 16 has a pair of slots 25 fashioned therein to extend therethrough. These slots allow the oil to drain downwardly into the lateral portions $D^1$ of the sump.

With respect to the lower section $C^2$ of the attachment, it has a channel-shaped cross-section (see Figure 2) providing a web 26 having a pair of spaced-apart side flanges 27 extending upwardly so as to straddle the flanges 17 of the upper section $C^1$. As disclosed in Figure 1, the upper surface of the web 26 is concaved so as to define the sump D.

Turning now to Figures 2 and 4, it will be noted that the lower section $C^2$ has a forward pair of curved partitions 28 extending from the funnel-shaped entrance H to a rear portion of the sump D. As clearly shown in Figure 4, these partitions converge rearwardly toward one another, and thus the forward portion of the wind-tunnel passageway is substantially Y-shaped. This shape will serve to increase the velocity of the air as it flows over the oil in the central portion D of the sump. These partitions have rear ends 28a around which the oil will flow from the lateral sump portions D¹ to the central oil sump portion D².

Moreover, a rear pair of partitions 29 are formed on the trailing part of the web 26 and extend forwardly so as to overlap the partitions 28. However, the partitions 29 are spaced outwardly beyond the partitions 28 in lateral directions. As shown in Figure 4, this arrangement will provide spaces 30 through which the oil will flow from the sump portions D¹ to the sump portion D², as suggested by the arrows 31.

In Figure 2, the web of the upper section C² has been illustrated as resting on the partitions 28 and 29 so as to be supported thereby. Also, the web 16 has a convexed lower wall surface 32 which overlies the oil and is disposed to direct the rearwardly-flowing air in the passageway toward the oil in the sump portion D².

As shown in Figures 1 and 4, the web 26 of the lower section C² is thickened somewhat at its trailing part between the partitions 29. This defines an inclined plane 33 that converges rearwardly toward the web 16 of the upper section C². Thus the outlet 12 of the wind-tunnel passageway E is restricted, thereby further increasing the velocity of the air flowing through this passageway. However, the web 26 extends rearwardly beyond the inclined plane 33 to provide a lip 34.

It has been found from practice that when the oil B is blown from the passageway E, a small residue 36 of the oil will tend to cling to the trailing end of the attachment; and, unless otherwise prevented, this oil will drip onto the floor of the garage. For this reason I have provided the lip 34, which serves to catch this small amount of oil, which will flow laterally around the partitions 29 by gravity, as suggested by the arrows 35 in Figure 4, for return to the lateral sump portions D¹ and subsequent flow into the central sump portion D² of the attachment. The web 26 slopes from the lip 34 and around the partitions 29, and thus the residue 36 of oil will flow by gravity from the lip to the lateral oil sump portions D¹ of the receptacle.

I claim:

1. In an oil-catching receptacle with speed-controlled oil-discharger attachment for automobiles: a receptacle disposed beneath a clutch pan of an automobile, and having a sump positioned to receive oil draining through an opening in the bottom of the clutch pan; means securing the receptacle to the clutch pan; the receptacle defining a wind-tunnel passageway that extends therethrough in a fore-and-aft direction, relative to the travel of the automobile; the passageway extending across the sump so that the air flowing through the passageway will entrain the oil, when the automobile has obtained a predetermined speed and the velocity of the air has reached a point sufficient to entrain the oil; the passageway having an outlet at the trailing end of the receptacle through which the entrained oil will be discharged upon the roadway.

2. In an oil-catching receptacle with speed-controlled oil-discharger attachment for automobiles: a receptacle disposed beneath a clutch pan of an automobile, and having a sump positioned to receive oil draining through an opening in the bottom of the clutch pan; means securing the receptacle to the clutch pan; the receptacle defining a wind-tunnel passageway that extends therethrough in a fore-and-aft direction, relative to the travel of the automobile; the passageway extending across the sump so that the air flowing through the passageway will entrain the oil, when the automobile has obtained a predetermined speed and the velocity of the air has reached a point sufficient to entrain the oil; the passageway having an outlet at the trailing end of the receptacle through which the entrained oil will be discharged upon the roadway; the passageway having a funnel-shaped entrance at the leading end of the receptacle; this passageway decreasing in cross-sectional area from its entrance to the sump, whereby the velocity of the air will be increased as it passes over the sump.

3. In an oil-catching receptacle with speed-controlled oil-discharger attachment for automobiles: a receptacle disposed beneath a clutch pan of an automobile, and having a sump positioned to receive oil draining through an opening in the bottom of the clutch pan; means securing the receptacle to the clutch pan; the receptacle defining a wind-tunnel passageway that extends therethrough in a fore-and-aft direction, relative to the travel of the automobile; the passageway extending across the sump so that the air flowing through the passageway will entrain the oil, when the automobile has obtained a predetermined speed and the velocity of the air has reached a point sufficient to entrain the oil; the passageway having an outlet at the trailing end of the receptacle through which the entrained oil will be discharged upon the roadway; the receptacle defining a convexed wall surface, which overlies the sump and is disposed to direct the rearwardly-flowing air in the passageway towards the oil in the sump.

4. In an oil-catching receptacle with speed-controlled oil-discharger attachment for automobiles: a receptacle disposed beneath a clutch pan of an automobile, and having a sump positioned to receive oil draining through an opening in the bottom of the clutch pan; means securing the receptacle to the clutch pan; the receptacle defining a wind-tunnel passageway that extends therethrough in a fore-and-aft direction, relative to the travel of the automobile; the passageway extending across the sump so that the air flowing through the passageway will entrain the oil, when the automobile has obtained a predetermined speed and the velocity of the air has reached a point sufficient to entrain the oil; the passageway having an outlet at the trailing end of the receptacle through which the entrained oil will be discharged upon the roadway; the passageway having a funnel-shaped entrance at the leading end of the receptacle; this passageway decreasing in cross-sectional area from its entrance to the sump, whereby the velocity of the air will be increased as it passes over the sump; the receptacle defining a convexed wall surface, which overlies the sump and is disposed to direct the rearwardly-flowing air in the passageway towards the oil in the sump.

5. In an oil-catching receptacle with speed-controlled oil-discharger attachment for automobiles: a receptacle disposed beneath a clutch pan of an automobile, and having a sump positioned to receive oil draining through an opening in the bottom of the clutch pan; means securing the receptacle to the clutch pan; the receptacle defining a wind-tunnel passageway that extends therethrough in a fore-and-aft direction, relative to the travel of the automobile; the passageway extending across the sump so that the air flowing through the passageway will entrain the oil, when the automobile has obtained a predetermined speed and the velocity of the air has reached a point sufficient to entrain the oil; the passageway having an outlet at the trailing end of the receptacle through which the entrained oil will be discharged upon the roadway; the trailing end of the receptacle being provided with a lip, which is disposed to catch a small residue of oil, as the oil is blown from the passageway; the receptacle being shaped for gravity flow of this residue of oil from the lip back to the sump.

6. In an oil-catching receptacle with speed-controlled oil-discharger attachment for automobiles: a receptacle mounted beneath a clutch pan of an automobile; the receptacle defining upper and lower sections; the lower section having a forward pair of partitions extending in a fore-and-aft direction, relative to the travel of the automobile; each of the sections having webs coacting with said partitions to define a wind-tunnel; which has an entrance end at the leading end of the receptacle; the receptacle having a central oil sump portion disposed between said partitions, and further having a pair of lateral oil sump portions disposed on opposite sides of the central sump portion; the upper section of the receptacle being positioned to receive oil draining through an opening in the bottom of the clutch pan, and being fashioned with slots through which this oil will flow into the lateral oil sump portion; said partitions having ends around which the oil will flow from the lateral oil sump portions into the central oil sump portion; the passageway extending across the central sump portion so that air flowing through the passageway will entrain the oil, when the automobile has obtained a predetermined speed and the velocity of the air has reached a point sufficient to entrain the oil; the passageway having an outlet at the trailing end of the receptacle through which the entrained oil will be discharged upon the roadway.

7. In an oil-catching receptacle with speed-controlled oil-discharger attachment for automobiles: a receptacle mounted beneath a clutch pan of an automobile; the receptacle defining upper and lower sections; the lower section having a forward pair of partitions extending in a fore-and-aft direction, relative to the travel of the automobile; each of the sections having webs coacting with said partitions to define a wind-tunnel, which has an entrance end at the leading end of the receptacle; the receptacle having a central oil sump portion disposed between said partitions, and further having a pair of lateral oil sump portions disposed on opposite sides of the central sump portion; the upper section of the receptacle being positioned to receive oil draining through an opening in the bottom of the clutch pan, and being fashioned with slots through which this oil will flow into the lateral oil sump portions; said partitions having ends around which the oil will flow from the lateral oil sump portions into the central oil sump portion; the lower section of the receptacle having a rear pair of partitions on the trailing part thereof, which extend forwardly to overlap said forward pair of partitions; the rear partitions being spaced from the forward partitions to provide space through which the oil will flow from the lateral sump portions to the central sump portion; the passageway extending across the central sump portion so that air flowing through the passageway will entrain the oil, when the automobile has obtained a predetermined speed and the velocity of the air has reached a point sufficient to entrain the oil; the passageway having an outlet at the trailing end of the receptacle through which the entrained oil will be discharged upon the roadway; the trailing end of the lower section being provided with a lip, which is disposed to catch a small residue of oil, as the oil is blown from the passageway; the lower section sloping from the lip and around the rear pair of partitions for gravity flow of the residue of oil from the lip to the lateral oil sump portions.

8. In an oil catching receptacle with oil discharger means for automobiles: a receptacle disposed beneath the housing of a component of an automobile power plant, and having a sump positioned to receive oil draining through an opening in the bottom of said housing; means securing the receptacle to said housing; the receptacle defining a wind tunnel passageway that extends therethrough in a fore and aft direction relative to the travel of the automobile; the passageway extending across the sump so that the air flowing through the passageway will entrain the oil when the automobile has obtained a predetermined speed and the velocity of the air has reached a point sufficient to entrain the oil; the passageway having an outlet at the trailing end of the receptacle through which the entrained oil will be discharged upon the roadway.

References Cited in the file of this patent
UNITED STATES PATENTS

| 1,630,639 | Taylor | May 31, 1927 |
| 1,957,075 | Morgensen | May 1, 1934 |